United States Patent [19]

Lee et al.

[11] 3,989,668

[45] Nov. 2, 1976

[54] METHOD OF MAKING A SILICONE ELASTOMER AND THE ELASTOMER PREPARED THEREBY

[75] Inventors: Chi-Long Lee; Gary M. Ronk, both of Midland, Mich.

[73] Assignee: Dow Corning Corporation, Midland, Mich.

[22] Filed: July 14, 1975

[21] Appl. No.: 595,913

[52] U.S. Cl. .................. 260/46.5 G; 260/37 SB; 260/46.5 UA
[51] Int. Cl.$^2$ .................................. C08G 77/04
[58] Field of Search ............... 260/46.5 G, 46.5 H, 260/46.5 UA

[56] References Cited

UNITED STATES PATENTS

| | | | |
|---|---|---|---|
| 3,445,420 | 5/1969 | Kookootsedes et al. | 260/37 SB |
| 3,627,851 | 12/1971 | Brady | 260/46.5 H X |

*Primary Examiner*—Lewis T. Jacobs
*Attorney, Agent, or Firm*—Roger H. Borrousch

[57] ABSTRACT

Mixing a hydroxyl endblocked polydiorganosiloxane, an organohydrogensiloxane, a platinum catalyst and a platinum catalyst inhibitor where the inhibitor is present in an amount of 0.0001 to 0.001 moles of inhibitor per 100 grams of hydroxyl endblocked polydiorganosiloxane and thereafter allowing the resulting mixture to cure, provides an elastomer.

7 Claims, No Drawings

METHOD OF MAKING A SILICONE ELASTOMER AND THE ELASTOMER PREPARED THEREBY

BACKGROUND OF THE INVENTION

1. Field of the Invention

This invention relates to a method of making a silicone elastomer which is vulcanized at room temperature.

2. Description of the Prior Art

Silicone elastomers which cure at room temperature are broadly known and many curing systems have been proposed including those which cure upon exposure to moisture. Platinum catalyzed compositions which cure to elastomers are known in the art such as those which result from mixing a vinyl containing siloxane polymer and a silicon-bonded hydrogen atom containing silicon compound in the presence of a platinum catalyst.

It is also known that silicon compounds containing silicon-bonded hydroxyl radicals can be reacted with silicon compounds containing silicon-bonded hydrogen atoms in the presence of chloroplatinic acid. This is described by Robert L. Merker in U.S. Pat. No. 2,967,170. Merker describes cured resinous products prepared by reacting various siloxane materials.

It was found that when a hydroxylated siloxane and a hydrogen siloxane were mixed with a platinum catalyst, the resulting mixture cured very quickly and with many undesirable voids. It was thus unexpected that an elastomer essentially free of voids could be made and cured at room temperature from a hydroxylated siloxane, a hydrogen siloxane and a platinum catalyst.

SUMMARY OF THE INVENTION

This invention relates to a method of making a silicone elastomer by mixing a hydroxyl endblocked polydiorganosiloxane, an organohydrogensiloxane, a platinum catalyst and a platinum catalyst inhibitor and thereafter allowing the mixture to cure to an elastomer at room temperature. The presence of the inhibitor in certain quantities allows the elastomer to cure at room temperature but also avoids the formation of undesirable voids in the cured product.

DESCRIPTION OF THE INVENTION

This invention relates to a method of making a silicone elastomer consisting essentially of mixing a hydroxyl endblocked polydiorganosiloxane having a viscosity of at least 1000 centipoise at 25° C., an organohydrogensiloxane having at least 2.1 silicon-bonded hydrogen atoms per molecule, a platinum catalyst and a platinum catalyst inhibitor selected from the group consisting of acetylenic alcohols and a polyorganosiloxane consisting essentially of from 3 to 10 siloxane units in which (a) at least one siloxane unit is selected from the group consisting of RHSiO and $$R_2HSiO_{0.5}$$

and (b) at least one siloxane unit is selected from the group consisting of

and

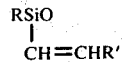

where the sum of siloxane units in (a) and (b) is equal to at least three siloxane units, (c) any remaining siloxane units being selected from the group consisting of $$R_3SiO_{0.5}, SiO_2 \text{ and } RSiO_{1.5}$$

where each siloxane unit of (c) does not exceed three siloxane units, where R is a monovalent radical selected from the group consisting of hydrocarbon radicals and perfluoroalkylethylene radicals, both having no more than six carbon atoms and R' is a monovalent hydrocarbon radical having a secondary or tertiary hydroxy substitution and having no more than ten carbon atoms, for each 100 parts by weight of hydroxyl endblocked polydiorganosiloxane there being present a sufficient amount of organohydrogensiloxane to provide a molar ratio of silicon-bonded hydrogen atoms per silicon-bonded hydroxyl radicals of from 1.5 to 4, the amount of platinum catalyst being present such that there is from 1 to 200 parts by weight platinum per one million parts by weight room temperature vulcanizable silicone elastomer, and the amount of platinum catalyst inhibitor being present in an amount such that there is present 0.0001 to 0.001 moles inhibitor per 100 grams of hydroxyl endblocked polydiorganosiloxane, allowing a composition obtained by the mixing procedure to set at room temperature until a cured silicone elastomer is obtained.

The hydroxyl endblocked polydiorganosiloxane can by any polymer having a viscosity of at least 1000 centipoise at 25° C. where the polymer is essentially made up of repeating units of diorganosiloxane where the organic groups are preferably monovalent hydrocarbon radicals of from one to six carbon atoms per radical, such as methyl, isopropyl, tertiary butyl, hexyl and cyclohexyl, and phenyl and 3,3,3-trifluoropropyl and mixtures of these organic groups. These polydiorganosiloxanes can be homopolymers, copolymers, mixtures thereof, mixtures of various molecular weight species and the like. Examples of the hydroxyl endblocked polydiorganosiloxane include, hydroxyl endblocked polydimethylsiloxane, hydroxyl endblocked copolymer of dimethylsiloxane units and phenylmethylsiloxane units and hydroxyl endblocked polymethyl-3,3,3-trifluoropropylsiloxane.

The organohydrogensiloxane can be any siloxane having an average of at least 2.1 silicon-bonded hydrogen atoms per molecule and an average of no more than one silicon-bonded hydrogen atom per silicon atom. The remaining valences of the silicon atoms are satisfied by divalent oxygen atoms or by monovalent hydrocarbon radicals having less than seven carbon atoms per radical such as methyl, isopropyl, tertiary butyl and cyclohexyl, and phenyl and 3,3,3-trifluoropropyl radicals. The organohydrogensiloxanes can be homopolymers, copolymers and mixtures thereof which contain siloxane units of the following types:

$RSiO_{1.5}, R_2SiO, R_3SiO_{0.5},$
$RHSiO, HSiO_{1.5}, R_2HSiO_{0.5},$
$H_2SiO, RH_2SiO_{0.5}$ and $SiO_2$ where R is the monovalent hydrocarbon radical defined above. Some specific examples include polymethylhydrogensiloxane cyclics, copolymers of trimethylsiloxy and methylhydrogensiloxane units, copolymers of dimethylhydrogensiloxy and methylhydrogensiloxane units, copolymers of trimethylsiloxy, dimethylsiloxane and methylhydrogensiloxane units and copolymers of dimethylhydrogensiloxy, dimethysiloxane and methylhydrogensiloxane units. Preferably, the organohydrogensiloxanes have an average of at least five silicon-bonded hydrogen atoms per molecule.

The platinum catalyst can be any of the known forms, ranging from platinum as deposited on carriers such as silica gel or powdered charcoal, to platinic chloride, salts of platinum and chloroplatinic acid. Any of these forms will function in the instant curing system. A preferred form of platinum is the chloroplatinic acid either as the commonly obtainable hexahydrate or the anhydrous form, because of its easy dispersability in organosilicon systems and its non-effect on color of the mixture. Another preferred platinum catalyst is a chloroplatinic acid catalyst complex as prepared by the mthod described in U.S. Pat. No. 3,419,593 which is hereby incorporated by reference, where chloroplatinic acid hexahydrate is mixed with symetrical divinyltetramethyldisiloxane to provide the complex. Another similar complex is one prepared from the chloroplatinic acid hexahydrate, symetrical divinyltetramethyldisiloxane, symetrical tetramethyldisiloxane and alcohol solvent. Additional platinum compounds which include,

platinum bromides, a complex of platinous halide and an olefin such as ethylene, propylene, butylene, cyclohexene and styrene,

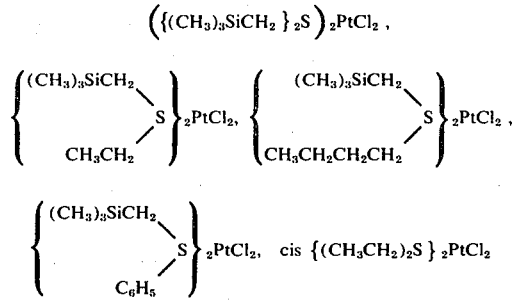

and

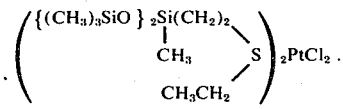

Additional platinum catalyst are known such as those described in column 4, lines 50 to 64 of U.S. Pat. No. 3,772,066 which is hereby incorporated by reference to show platinum catalyst.

Platinum catalyst inhibitors are known in the art and many varieties are available. The platinum catalyst inhibitors for this invention include the acetylenic alcohols, such as 3,5-dimethyl-1-hexyn-3-ol, 3-phenyl-1-butyn-3-ol, 3-methyl-1-pentyn-1-ol, 1-ethynylcyclohexan-1-ol and 3-methyl-1-butyn-3-ol. The acetylenic alcohols are further defined in U.S. Pat. No. 3,445,420 which is hereby incorporated by reference to show this class of inhibitors. The platinum catalyst inhibitors of this invention which are the polyorganosiloxanes defined above are known in application Ser. No. 528,966, filed Dec. 2, 1974 by Chi-Long Lee and Ollie W. Marko and assigned to the same assignee as this application, which is hereby incorporated by reference to show the preparation and further details of these polyorganosiloxane inhibitors. These polyorganosiloxanes are best prepared by continuously passing a mixture of an acetylenic alcohol, a platinum catalyst and a siloxane compound having at least three silicon-bonded hydrogen atoms through a heating means wherein the mixture is heated above 100° C. and above the temperature at which the reaction product no longer inhibits the reaction under sufficient pressure to maintain the reaction mixture in the liquid state and recovering the polyorganosiloxane inhibitors. This method is more fully described by Floyd A. Bergstrom, Chi-Long Lee and Myron T. Maxson in an application entitled "Method of Preparing A Platinum Catalyst Inhibitor", Ser. No. 528,961, filed Dec. 2, 1974 and assigned to the same assignee as this application. Said Bergstrom et al. application is hereby incorporated by reference to show the preparation of the polyorganosiloxane inhibitors.

The hydroxyl endblocked polydiorganosiloxane, organohydrogensiloxane, platinum catalyst and platinum catalyst inhibitor can be mixed in any order, but it is preferred to have the platinum catalyst inhibitor present when the platinum catalyst is added. The room temperature vulcanizable silicone elastomer can best be prepared by mixing the hydroxyl endblocked polydiorganosiloxane and organohydrogensiloxane and then adding a mixture of platinum catalyst and inhibitor. Alternatively, the hydroxyl endblocked polydiorganosiloxane can be present in both mixtures prior to their combination into the curable composition. A filler can be present in the composition by adding it to either mixture, preferably to the hydroxyl endblocked polydiorganosiloxane mixture. The filler can be a reinforcing silica either treated or untreated with silanes or siloxanes, or a non-reinforcing or semi-reinforcing filler such as ground or crushed quartz, calcium carbonate and titanium dioxide. Other additives can be present such as solvents, heat stability additives, plasticizers, handling additives and the like.

After the ingredients are mixed the resulting composition is placed in position where it is desired for use and it is allowed to cure at room temperature. Curing takes place in a few hours after mixing to several days depending upon the particular ingredients and amount of inhibitor. This composition must be cured at room temperature to avoid the formation of voids or bubbles in the elastomer. For each, 100 parts by weight of hydroxyl endblocked polydiorganosiloxane there is present a sufficient amount of organohydrogensiloxane to provide a molar ratio of from 1.5 to 4 silicon-bonded hydrogen atoms per silicon-bonded hydroxyl radical, preferably from 2 to 3.5. The platinum catalyst can be present in amounts sufficient to provide from 1 to 200 parts by weight platinum per 1 million parts by weight room temperature vulcanizable silicone elastomer. The platinum catalyst inhibitor is present in an amount such that there is from 0.0001 to 0.001 mole of inhibitor per 100 grams of hydroxyl endblocked polydiorganosiloxane. When the amount of inhibitor is less than 0.0001 moles per 100 grams of polydiorganosiloxane the resulting mixture cures to a material which contains voids as a result of gassing. When the amount of inhibitor exceeds 0.001 mole of inhibitor per 100 grams of polydiorganosiloxane, the resulting mixture does not cure at room temperature in any reasonable time period and as a result the mixture is not useful as a room temperature vulcanizable silicone elastomer. Heating the compositions of this invention in an attempt to accelerate the cure, results in the formation of too many voids or bubbles.

The silicone elastomers of this invention can be used in applications where silicone elastomers are conventionally used, preferably used in places where thin sections are desired. They can be used for coatings, sealants, potting applications castings and the like.

The following example is presented for illustrative purposes only and should not be construed as limiting the present invention which is properly delineated in the claims.

EXAMPLE

A mixture of 100 parts by weight of a hydroxyl endblocked polydimethylsiloxane having a viscosity of about 2,000 centipoise at 25° C., W parts by weight of a trimethylsiloxy endblocked polymethylhydrogensiloxane having about 1.6 weight percent silicon-bonded hydrogen atoms and X parts by weight of a filler was prepared by thoroughly mixing. To this mixture was added a mixture of 12 parts by weight platinum per 1 million parts by weight of total composition added in the form of a chloroplatinic acid catalyst complex with symetrical divinyltetramethyldisiloxane containing about 0.65 weight percent platinum and Y parts by weight of a platinum catalyst inhibitor as shown in the Table. Each composition cured to a silicone elastomer when allowed to set at room temperature in thin layers.

Inhibitor A was 3-methyl-1-butyn-3-ol.
Inhibitor B was 3,5-dimethyl-1-hexyn-3-ol.
Inhibitor C was a polyorganosiloxane inhibitor having an average of two trimethylsiloxy units, one methylhydrogensiloxane unit and two units of the formula

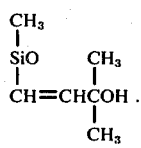

Filler D was a trimethylsilyl treated fume silica filler.
Filler E was a 5 micron quartz filler.

Table

| Composition | W | Filler | X | Inhibitor | Y | Curing Comments |
|---|---|---|---|---|---|---|
| 1. | 2.0 | — | 0 | A | 0.017 | Cured in 18 hours |
| 2. | 2.0 | — | 0 | A | 0.034 | Cured in 18 hours |
| 3. | 1.32 | — | 0 | A | 0.04 | Cured in 6 hours one bubble |
| 4. | 1.32 | D | 10 | A | 0.08 | Cured in 3 days |
| 5. | 2.0 | E | 10 | B | 0.12 | Cured in several days |
| 6. | 1.32 | D | 10 | B | 0.12 | Cured in 3 days |
| 7. | 1.32 | — | 0 | C | 0.4 | Cured in 24 hours one bubble |
| 8. | 1.32 | D | 10 | C | 0.4 | Cured in 3 days |

That which is claimed is:

1. A method of making a silicone elastomer consisting essentially of
   mixing a hydroxyl endblocked polydiorganosiloxane having a viscosity of at least 1000 centipoise at 25° C., an organohydrogensiloxane having at least 2.1 silicon-bonded hydrogen atoms per molecule, a platinum catalyst and a platinum catalyst inhibitor selected from the group consisting of acetylenic alcohols and a polyorganosiloxane consisting essentially of from 3 to 10 siloxane units in which (a) at least one siloxane unit is selected from the group consisting of RHSiO and

and (b) at least one siloxane unit is selected from the group consisting of

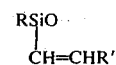

and

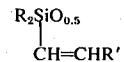

where the sum of siloxane units in (a) and (b) is equal to at least three siloxane units, (c) any remaining siloxane units being selected from the group consisting of

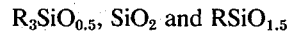

where each siloxane unit of (c) does not exceed three siloxane units, where R is a monovalent radical selected from the group consisting of hydrocarbon radicals and perfluoroalkylethylene radicals, both having no more than six carbon atoms and R' is a monovalent hydrocarbon radical having a secondary or tertiary hydroxy substitution and having no more than ten carbon atoms, for each 100 parts by weight of hydroxyl endblocked polydiorganosiloxane there being present a sufficient amount of organohydrogensiloxane to provide a molar ratio of silicon-bonded hydrogen atoms per silicon-bonded hydroxyl radicals of from 1.5 to 4, the amount of platinum catalyst being present such that there is from 1 to 200 parts by weight platinum per 1 million parts by weight room temperature vulcanizable silicone elastomer, and the amount of platinum catalyst inhibitor being present in an amount such that there is present 0.0001 to 0.001 moles inhibitor per 100 grams of hydroxyl endblocked polydiorganosiloxane,
   allowing a composition obtained by the mixing procedure to set at room temperature until a cured silicone elastomer is obtained.

2. The method in accordance with claim 1 in which the platinum catalyst inhibitor is 3-methyl-1-butyn-3-ol.

3. The method in accordance with claim 1 in which the platinum catalyst inhibitor is 3,5-dimethyl-1-hexyn-3-ol.

4. The method in accordance with claim 1 in which the platinum catalyst inhibitor is a polyorganosiloxane.

5. The method in accordance with claim 1 in which a filler is present.

6. A silicone elastomer obtained by the method of claim 1.

7. A silicone elastomer obtained by the method of claim 5.

* * * * *